United States Patent Office 3,246,006
Patented Apr. 12, 1966

3,246,006
2-(3-AZABICYCLO[3.2.0]HEPT-3-YLTHIO)
BENZOTHIAZOLE
Wilhelm Franz Gruber, Wilmington, Del., assignor to E. I. du Pont de Nemours and Company, Wilmington, Del., a corporation of Delaware
No Drawing. Filed Aug. 7, 1963, Ser. No. 300,659
1 Claim. (Cl. 260—306.6)

This invention relates to a novel sulfur-containing chemical compound, its preparation and its use as a vulcanization accelerator for sulfur-curable elastomers.

While various 2-(substituted-aminothio)benzothiazoles are known to be accelerators for vulcanization of butadiene-styrene copolymer elastomers, there is a surprising and unpredictable variation among different compounds of this type with respect to their processing safety and their effect on rate and quality of cure.

It has unexpectedly been found that the novel compound of this invention, the compound 2-(3-azabicyclo[3.2.0]hept-3-ylthio)benzothiazole, when used as a vulcanization accelerator for butadiene-styrene copolymer elastomers shows a significant advantage in processing safety (as evidenced by Mooney Scorch Test data).

The chemical compound of this invention is prepared by an oxidative condensation of 3-azabicyclo[3.2.0]heptane with 2-mercaptobenzothiazole. A satisfactory procedure is to dissolve 2-mercaptobenzothiazole in an aqueous alkaline solution, e.g., one containing at least enough sodium hydroxide to react with the 2-mercaptobenzothiazole. An equimolar amount of 3-azabicyclo[3.2.0]heptane is then slowly added to the solution while agitating. 2-mercaptobenzothiazole is then precipitated by the addition of an acid, e.g., dilute sulfuric acid. This step of the process is conveniently carried out at ambient temperatures and pressures. An oxidizing agent such as sodium hypochlorite is then added at 10–15° C. and allowed to react. After destroying the excess sodium hypochlorite by the addition of sodium sulfite, the product is filtered off, washed and dried, and further purified by conventional techniques, such as by recrystallization.

The starting material, 3-azabicyclo[3.2.0]heptane has the formula

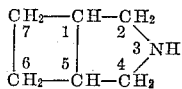

It may be prepared by the reduction of trans-1,2-dicyanocyclobutane to trans-1,2-bis(aminomethyl)cyclobutane and ring closure of this compound to form 3-azabicyclo[3.2.0]heptane. This method is illustrated in Example I.

Butadiene-styrene copolymer elastomers are prepared by the emulsion polymerization of butadiene and styrene as described in numerous references; see, for example, U.S. Patent 1,938,731 and M. Morton, "Introduction to Rubber Technology," Reinhold Publishing Corp., 1959, pages 256–284. The most commonly used butadiene-styrene copolymers contain 76.5 percent of butadiene and 23.5 percent of styrene, although other butadiene-styrene copolymers may contain up to 45 percent styrene.

The vulcanization procedures to be used in practicing the invention, except for the use of the new chemical compound, are conventional. The vulcanizing accelerator is usually sulfur which is intimately admixed with the raw elastomer in amounts between about 0.5 and 15 parts, by weight, per 100 parts of elastomer. The new compound of this invention may be incorporated in amounts ranging from about 0.4 part to about 1 part, by weight, per 100 parts of elastomer. Less than 0.4 part is insufficient to produce vulcanizates of satisfactory properties and more than 1 part is not required and is uneconomical. The mixture to be vulcanized may also contain various other compounding ingredients, depending on the particular use that is to be made of the elastomer. Ingredients that may be used include the following: softeners such as refined, heavy coal-tar fractions, process oils, or petroleum asphalts; fillers such as carbon black or clay; activators such as metal oxides (usually zinc oxide), fatty acids, or rosin acids. The conventional antioxidants may be used. Coloring materials may be added if desired.

The compounding ingredients may be added to the solid polymer or to the latex by conventional techniques. Conventional methods of fabrication, molding, and curing may be used.

The vulcanization temperatures to be used are conventional and well known to those skilled in the art. They usually range from 140° C. to 200° C.

The compound of this invention is also an effective and safe-processing vulcanization accelerator for natural rubber.

The invention will now be described with reference to the following examples of preferred embodiments thereof wherein parts and percentages are by weight unless otherwise specified.

EXAMPLE I

A. Preparation of 3-azabicyclo[3.2.0]heptane 40 parts of trans-1,2-dicyanocyclobutane, 88 parts of anhydrous ammonia, and 15 parts of Raney nickel catalyst are charged into a stainless steel shaker vessel fitted with pressure- and temperature-sensing elements. The closed vessel, with contents, is heated for one hour at a temperature of 135–150° C., the corresponding pressure range being 450–600 atmospheres. The reactor is cooled to room temperature, vented, and the contents are washed out with methanol. The methanol solution is filtered to remove the metal catalyst, and the filtrate is distilled at atmospheric pressure to remove methanol, then at reduced pressure to recover about 26 parts of trans-1,2-bis(aminomethyl)cyclobutane boiling at 40–60° at 2–4 mm. of mercury. Redistillation gives product boiling at 80–82° C. at 10 mm. Hg.

A mixture of 44 parts of trans-1,2-bis(aminomethyl)-cyclobutane, prepared as described above, 80 parts of methanol, and 10 parts of Raney nickel is agitated in a stainless steel autoclave and heated at 200° C. for two hours under autogeneous pressure. The reaction mixture is cooled to room temperature, filtered to remove the catalyst, and distilled through a suitable fractionating column, collecting the material coming overhead at about 133° C. to 145° C. Redistillation gives 3-azabicyclo-[3.2.0]heptane boiling at about 136° C. to 137° C. at the prevailing atmospheric pressure and having a refractive index, $n_D^{27}=1.4750$. The yield is about 33% of the theoretical value.

B. Preparation of 2-(3-azabicyclo[3.2.0]hept-3-ylthio) benzothiazole

About 70 g. of 2-mercaptobenzothiazole (0.42 mole) is dissolved in a solution of 17 g. (0.425 mole) of sodium hydroxide in 100 ml. of distilled water. The clear solution is transferred into a 2-liter round-bottom flask, equipped with a mechanical stirrer, a dropping funnel and a thermometer. During a period of 20 minutes 40.7 g. (0.42 mole) of 3-azabicyclo[3.2.0] heptane is added at room temperature to the well-agitated solution. 2-mercaptobenzothiazole is then precipitated as a fine powder by slow addition of 70 ml. of 25% sulfuric acid (20.6 g., 0.21 mole $H_2SO_4$) over a period of 20 minutes. After stirring for another 20 minutes at room temperature, the contents of the flask are cooled to 10–15° C.;

a 5% solution of sodium hypochlorite (680 ml., 0.47 mole NaOCl) is added over a period of 2 hours to the well-agitated mixture kept at 10–15° C. The excess of the hypochlorite is destroyed by slow addition of a solution of 8 g. of sodium sulfite in 70 ml. of water. The product is collected on a Büchner funnel and washed with cold water. After drying in a desiccator, the yield of crude 2 - (3 - azabicyclo[3.2.0]hept-3-ylthio)benzothiazole is 107 g. (92.3% of the theoretical based on 3-azabicyclo[3.2.0]heptane) having a melting point of 115–125° C. The sample for analysis and testing is prepared by recrystallization of the crude product from hexane: M.P. 123–125° C. (uncorr.). Analyses show the following:

|  | Calculated for $C_{13}H_{14}N_2S_2$ | Found |
| --- | --- | --- |
| Percent C | 59.50 | 58.9–59.2 |
| Percent H | 5.38 | 5.2–5.3 |
| Percent N | 10.68 | 10.7 |
| Percent S | 24.43 | 24.3–24.5 |

EXAMPLE II

A compounded stock is prepared using the following recipe:

| | Parts by weight |
| --- | --- |
| Butadiene-styrene copolymer | 100 |
| High abrasion furnace black | 52 |
| Process oil | 10 |
| N-phenyl-2-naphthylamine | 1 |
| Stearic acid | 1.5 |
| Zinc oxide | 5 |
| Sulfur | 2 |
| 2 - (3 - azabicyclo[3.2.0]hept-3-ylthio)benzothiazole (accelerator) | 0.5 |

The butadiene-styrene copolymer used is SBR–1500 (previously known as GR–S–1500). It contains 23.5% bound styrene, has a Mooney viscosity (ML–4) of about 52, and a specific gravity of 0.94.

As a measure of processing safety Mooney scorch data are obtained at 138° C. according to ASTM Method D 1646–61 using the small rotor. Tensile properties are measured at 25° C. by ASTM Method D 412–61 T.

Typical test results obtained are as follows:

MOONEY SCORCH

| | |
| --- | --- |
| Minimum | 23 |
| Minutes to 10-point rise | 40 |

TENSILE PROPERTIES

| Cure, Minutes at 166° C. | 5 | 10 | 20 |
| --- | --- | --- | --- |
| Modulus at 300% Elongation, p.s.i. | 600 | 925 | 1,200 |
| Tensile Strength at Break, p.s.i. | 2,100 | 2,925 | 3,350 |
| Elongation at Break, percent | 760 | 675 | 660 |

EXAMPLE III

A compounded stock is prepared using the same recipe as shown in Example II except that 0.9 part of the accelerator is used.

Typical test results are as follows:

MOONEY SCORCH

| | |
| --- | --- |
| Minimum | 22 |
| Minutes to 10-point rise | 41 |

TENSILE PROPERTIES

Modulus at 300% elongation, p.s.i.:
Cure, minutes at 166° C.—
 5 .................................................. 1125
 10 .................................................. 1550
 20 .................................................. 1750
 30 .................................................. 1725

Tensile strength at break, p.s.i.:
Cure, minutes at 166° C.—
 5 .................................................. 3250
 10 .................................................. 3700
 20 .................................................. 3550
 30 .................................................. 3475

Elongation at break, percent:
Cure, minutes at 166° C.—
 5 .................................................. 660
 10 .................................................. 600
 20 .................................................. 510
 30 .................................................. 490

If, for comparison, the above example is repeated except that the accelerator of this invention is replaced with a corresponding compound whose aminothio-substituent ring is monocyclic instead of bicyclic, it is found that the tensile strength and the elongation of the stock so prepared is about 20% poorer than the vulcanizate of this example; in addition, the Mooney Scorch Test will reveal a shorter number of minutes-to-10-point-rise indicating a lower degree of processing safety.

EXAMPLE IV

A compounded natural rubber stock is prepared using the following recipe:

| | Parts by weight |
| --- | --- |
| Blended smoked sheets | 100 |
| High abrasion furnace black | 45 |
| Zinc oxide | 5 |
| Stearic acid | 3 |
| Pine tar | 2 |
| Sulfur | 2.25 |
| N-phenyl-2-naphthylamine | 2 |
| Accelerator of Example II | 0.6 |

The stock is tested for safety in processing and for effectiveness of curing, using the same methods as in the previous examples. Typical results are shown below.

MOONEY SCORCH

| | |
| --- | --- |
| Minimum | 28 |
| Minutes to 10-point rise | 29 |

TENSILE PROPERTIES

Modulus at 300% elongation (p.s.i.):
Cure, minutes at 154° C.—
 5 .................................................. 1725
 10 .................................................. 1975
 20 .................................................. 2000

Tensile strength at break (p.s.i.):
Cure, minutes at 154° C.—
 5 .................................................. 4600
 10 .................................................. 4550
 20 .................................................. 4550

Elongation at break, percent:
Cure, minutes at 154° C.—
 5 .................................................. 605
 10 .................................................. 555
 20 .................................................. 550

The novel chemical compound of this invention has been shown above to have exceptional utility as a vulcanization accelerator for sulfur-curable elastomers. Further, styrene-butadiene elastomer vulcanizates prepared using the novel compound as an accelerator have been shown to possess unexpectedly superior properties.

What is claimed is:
The compound 2-(3-azabicyclo[3.2.0]hept-3-ylthio)-benzothiazole.

References Cited by the Examiner
UNITED STATES PATENTS

| | | | |
| --- | --- | --- | --- |
| Re. 19,286 | 8/1934 | Zaucker et al. | 260—306.61 |
| 2,415,029 | 1/1947 | Smith | 260—306.6 |
| 2,417,989 | 3/1947 | Moore et al. | 260—306.6 |
| 2,419,294 | 4/1947 | Skaptason | 260—306.61 |
| 2,762,814 | 9/1956 | Lunt | 260—306.61 |
| 2,962,481 | 11/1960 | Kerrigan et al. | 260—79.5 |
| 2,996,483 | 8/1961 | Bentz et al. | 260—79.5 |
| 3,096,341 | 7/1963 | Sheppard et al. | 260—306.61 |

NICHOLAS S. RIZZO, *Primary Examiner.*